United States Patent [19]

Staerzl

[11] 4,405,892
[45] Sep. 20, 1983

[54] REGULATOR FOR A GENERATOR ENERGIZED BATTERY

[75] Inventor: Richard E. Staerzl, Fond du Lac, Wis.

[73] Assignee: Brunswick Corporation, Skokie, Ill.

[21] Appl. No.: 221,624

[22] Filed: Dec. 31, 1980

Related U.S. Application Data

[63] Continuation-in-part of Ser. No. 59,054, Jul. 19, 1979, Pat. No. 4,320,335.

[51] Int. Cl.³ .............................. H02J 7/10; H02P 9/00
[52] U.S. Cl. ........................................ 322/89; 322/94; 320/59; 320/61
[58] Field of Search ............... 320/25, 57, 59, DIG. 2, 320/61; 322/89, 90, 95, 94

[56] References Cited

U.S. PATENT DOCUMENTS

| 3,296,515 | 1/1967 | Knauth | 320/25 |
| 3,710,227 | 1/1973 | Hill | 320/59 |
| 3,857,082 | 12/1974 | van Opijnen | 320/59 X |
| 4,220,909 | 9/1980 | Piteo | 320/59 X |

Primary Examiner—R. J. Hickey
Attorney, Agent, or Firm—Andrus, Sceales, Starke & Sawall

[57] ABSTRACT

An energy regulating system (21) includes a battery (25) connected to a single phase generator winding (23) through a connecting circuit (24) providing a full wave bridge rectifier (26) having a pair of controlled rectifiers (69, 71) which are selectively gated into connection in response to the sensed phase angle of the energy in the winding (23). A control (54) operates in response to a charge sensor (31) which senses the charge on the battery (25) and a phase sensor (79) which senses the energy phase at the winding (23) to operate a switch (44) to modify the operation of the bridge circuit (26) to interrupt the energy flow to the battery (25). An excessive energy sensor (80) responds to excessive sensed energy at the connecting circuit (24) to turn on a pair of controlled rectifiers (53, 70) to deactivate the bridge circuit (26) to prevent damage to the connecting circuit (24).

2 Claims, 1 Drawing Figure

REGULATOR FOR A GENERATOR ENERGIZED BATTERY

RELATED APPLICATION

This is a continuation in part (CIP) application of the co-pending U.S. patent application Ser. No. 59,054 filed on July 19, 1979 by Richard Elmer Staerzl and entitled Energy Regulating System, now U.S. Pat. No. 4,320,335.

DESCRIPTION

1. Technical Field

This invention relates to a regulator for use in a generator operated charging system for a battery.

2. Background Art

Conventional battery charging systems have employed a full wave bridge rectifier for connecting a single phase alternator winding to a battery thereby converting AC energy to DC energy to charge the battery. Where an alternator continuously operates for a substantial period of time, overcharging of the battery may occur which, in some instances, may destroy the battery due to an excessive current condition.

Disclosure of Invention

An energy regulating system selectively supplies electrical energy from a generator winding to a battery through a connecting circuit including a controlled rectifier which is gated into conduction in response to a sensed predetermined energy phase supplied by the winding to selectively supply energy to maintain a charge on the battery. The inoperativeness of the winding disables the rectifier to prevent damage to the connecting circuit if the battery is improperly connected with reverse polarity.

A switch is connected to the connecting circuit and is selectively operated in response to the sensed charge on the battery and the phase of the generated energy in the winding to selectively interrupt the energy flow to the battery to reduce the charge thereat to prevent an overcharged condition. An excessive energy sensor monitors the connecting circuit and operates a switch to disable the connecting circuit in response to excessive energy or transient conditions.

BRIEF DESCRIPTION OF THE DRAWING

The FIGURE is a circuit schematic including block diagrams illustrating an energy regulator for use with a battery.

BEST MODE FOR CARRYING OUT THE INVENTION

Figure 1:
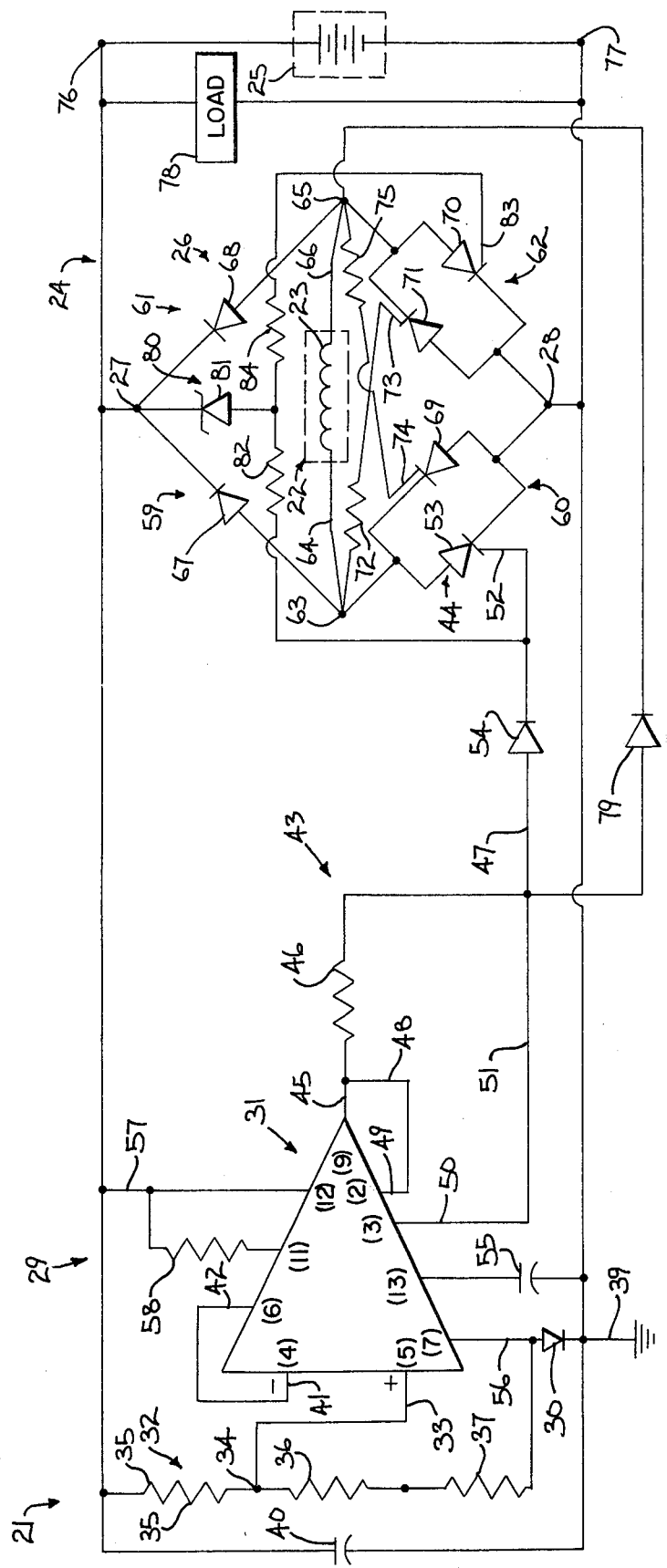

An energy regulating system 21 provides a single phase alternator 22 including an electrical generating winding 23. A connecting circuit 24 electrically joins the winding 23 to a battery 25 and includes a full wave bridge circuit 26 having a terminal 27 connected to a positive terminal 76 of battery 25 and a terminal 28 connected to a negative terminal 77 of battery 25.

A voltage sensing circuit 29 is electrically connected to the positive terminal 76 of battery 25. An integrated circuit 31 is connected to the voltage sensing circuit 29 through a voltage divider circuit 32. The integrated circuit 31 operates as a comparator and may be purchased from any one of a number of manufacturing sources, such as Texas Instruments, for example, under the designation uA723C. A non-inverting input 33 of the integrated circuit 31 is connected to the voltage divider 32 and particularly to a connecting circuit 34 joining a resistor 35 and a resistor 36. The resistor 36 is connected through a serially connected resistor 37 and a diode 30 to the system neutral or ground circuit 39. A stabilizing capacitor 40 is parallel connected to the voltage divider 32 and operates to short circuit high frequency transients which may be received through the voltage sensing circuit 29.

An inverting input 41 of the integrated circuit 31 is connected to a $V_{ref}$ terminal 42 provided by the integrated circuit 31. In such manner, a highly regulated reference signal $V_{ref}$ is maintained at the inverting input 41 which is at a substantially constant magnitude and independent of temperature variations and of variations in battery potential. An output circuit 43 interconnects the integrated circuit 31 to a switch 44 and includes a connecting circuit 45, a current sensing resistor 46 and a connecting circuit 47. A feedback circuit 48 is connected to circuit 45 to provide feedback to a current limiting input 49 of the integrated circuit 31. The connecting circuit 47 is connected to a current sense terminal 50 of the integrated circuit 31 through a connecting circuit 51 and to a gate circuit 52 of a silicon controlled rectifier (SCR) 53 comprising the switch 44 through a diode 54.

A compensating capacitor 55 is connected to the compensation terminal of integrated circuit 31 while the V− terminal is connected to the system neutral or ground 39 through a circuit 56 and the diode 30. The V+ and $V_c$ terminals of integrated circuit 31 are connected to the voltage sensing circuit 29 through a connecting circuit 57 including resistor 58. The resistor 58 provides voltage protection for the integrated circuit 31.

The potential of battery 25 is sensed through sensing circuit 29 which is monitored at the non-inverting input 33 of the integrated circuit 31. When the potential at input 33 increases to a predetermined level, such as seven volts D.C., for example, as established by the reference potential $V_{ref}$ appearing at the inverting input 41, the integrated circuit 31 switches from an OFF to an ON condition to supply an energizing signal through the output 43 to the gate circuit 52 of switch 44. The appearance of a predetermined signal at input 33 signifies that battery 25 has been charged to a predetermined level, such as 14.2 volts D.C., for example, and that additional charging could result in battery 25 receiving excessive current which might otherwise damage or destroy battery 25.

The output at connecting circuit 45 of output 43 is fed back through circuit 48 to provide a current limit to the energizing signal at output 43 as provided through the integrated circuit 31. In such manner, an excessive signal at output 43 operatively functions through the current limit input 49 of the integrated circuit 31 to reduce the amount of current supplied to connecting circuit 43 and maintain the energizing output within a preestablished value for safe operation and the protection of SCR 53.

The bridge circuit 26 includes four circuit legs 59, 60, 61 and 62. The bridge legs 59 and 61 are interconnected at terminal 27 while bridge legs 60 and 62 are interconnected at terminal 28. The bridge legs 59 and 60 are interconnected at a terminal 63 which, in turn, is connected through a lead 64 to the alternator winding 23. The bridge legs 61 and 62 are connected at a terminal 65 which, in turn, is connected through a circuit 66 to the alternator winding 23.

A diode 67 comprises the leg 59 and has its anode circuit connected to terminal 63 and its cathode circuit connected to terminal 27. Similarly, a diode 68 comprises the circuit leg 61 and has its anode circuit connected to terminal 65 and its cathode circuit connected to terminal 27. The SCR 53 is within circuit leg 60 and has its anode circuit connected to terminal 63 and its cathode circuit connected to terminal 28. An SCR 69 is connected in parallel with SCR 53 but has its anode circuit connected to terminal 28 and its cathode circuit connected to terminal 63. The bridge leg 62 includes a pair of parallel connected SCRs 70 and 71. The SCR 70 has its anode circuit connected to terminal 65 and its cathode circuit connected to terminal 28. The SCR 71 has its anode circuit connected to terminal 28 and its cathode circuit connected to terminal 65.

In operation, the alternator 22 produces an alternating signal across the winding 23 which is fully rectified to provide direct current energization to maintain the charge upon battery 25. At one point of the alternating cycle, the output circuit 64 of winding 23 is positive when the output circuit 66 goes negative which will provide a gating signal through terminal 63 and a connecting resistor 72 to a gate circuit 73 to render the SCR 71 conductive. In such manner, a charging path is provided to battery 25 from winding 23 through circuit 64, terminal 63, diode 67, terminal 27, battery 25, terminal 28, SCR 71, terminal 65 and circuit 66 to winding 23. At another point in operation, the circuit 66 is positive when circuit 64 becomes negative which will provide a gating pulse to a gate circuit 74 of SCR 69 through terminal 65 and a resistor 75. In such manner, the winding 23 will provide a charging input to battery 25 through circuit 66, terminal 65, diode 68, terminal 27, battery 25, terminal 28, SCR 69, terminal 63 and circuit 64 to the winding 23. The battery 25 is thereby continually charged by the operation of alternator 22 to maintain energizing power at battery 25 which, in turn, may be connected to energize a load 78 such as a radio, stereo or any other type of desired equipment.

The operation of the SCRs 69 and 71 are phase controlled to provide a precise turn on in response to the relative phase of the alternating current provided by winding 23. Such construction provides turn on of an appropriate SCR almost immediately after the polarity reverses in winding 23. The phase controlled switching ensures efficient energy conversion.

When the integrated circuit 31 turns on, an energizing signal is provided to the anode circuit of diode 54 and to an anode circuit of a diode 79 which, in turn, has a cathode circuit connected to terminal 65 of bridge 26. In order to gate the SCR 53 into conduction, a potential voltage greater than or equal to the voltage at 47 minus the voltage drop of 79 must exist at circuit 66 of winding 23 so as to reverse bias diode 79. With diode 79 reversed biased, the energizing signal supplied by integrated circuit 31 is conducted through diode 54 to gate SCR 53 into conduction to provide a short circuit path around the SCR 69. In such manner, energy from winding 23 of alternator 22 is gated through SCR 53 to the system neutral or ground 39 and is thus diverted away from battery 25. A sensed overcharged condition of battery 25 is thereby reduced to an appropriate voltage level. When the battery charge drops in response to the operation of SCR 53 so as to decrease below a predetermined level, such as below 14.2 volts DC for example, the integrated circuit 31 will turn off and the SCR 53 will no longer conduct.

The operation of SCR 53 by the output of comparator 31 is thus phase controlled and will be rendered conductive almost immediately when the potential at terminal 65 allows the diode 79 to be reversed biased. Such phase control of SCR 53 permits a precise turn on at the early stages of polarity reversal to substantially eliminate commutation problems which might otherwise exist if SCR 53 were turned on when substantial voltages were being produced by winding 23. For example, if SCR 53 were rendered conductive when a maximum positive voltage existed at terminal 63, the diode 67 might, for a fraction of a millisecond, function as a dead short when commutated at such a peak voltage level which could damage the circuit elements or insert a negative spike at terminal 76.

A transient protection circuit 80 includes a Zener diode 81 having a cathode circuit connected to terminal 27 and an anode circuit connected to operate the SCRs 53 and 70. Specifically, the anode circuit of Zener diode 81 is connected to gate 52 of SCR 53 through a resistor 82 and to gate circuit 83 of SCR 70 through a resistor 84.

In operation, the comparator circuit 31 operates to sense a first predetermined voltage level of battery 25 to operate the SCR 53 to permit the reduction of voltage at battery 5 to acceptable levels. The Zener diode 81, on the other hand, responds to an excessive second predetermined magnitude voltage appearing at terminal 27 to operate both SCRs 53 and 70 to totally deactivate the bridge circuit 26 so that no energy will be supplied from winding 23 to battery 25. The transient protection circuit 80 has been found to be highly desirable and protects the bridge circuit 26 and external circuitry connected to terminal 76 in the event of extreme transient conditions, such as above 34 volts for example, which might be caused if a battery lead became disconnected or resulted in an intermittent open circuit which would otherwise cause the bridge circuit 26 to run as an open circuit.

The circuit construction of bridge 26 also prevents circuit damage from an improper connection of the battery 25 in a reverse plurality manner. For example, the connection of terminal 76 of battery 25 to terminal 28 of bridge circuit 26 would not cause any damage to the bridge circuit 26 while winding 23 is de-energized. In other words, the SCR 69 and 71 cannot be operated until the alternator 22 is in operation and an inadvertent improper connection of battery 25 to the bridge circuit 26 will not provide any adverse effect upon the circuit.

The protection circuit for the energy regulator senses a first predetermined magnitude battery voltage and operates to modify the bridge circuit operation to permit the reduction of charge at the battery to an acceptable level and in accordance with the sensed phase of the generated voltage. The circuit further operates to sense a second predetermined magnitude voltage at the bridge circuit to totally deactivate the operation of the bridge to protect its circuits. The gating of the rectifying elements of the bridge is controlled by the operation of the alternator so that an improper connection of the battery to such circuit will fail to cause any damage to the circuit elements. The phase control of the bridge results in an efficient energy conversion operation.

I claim:

1. An energy regulating system to maintain a charge on a battery by an electrical energy generating winding of a generator, said regulating system comprising a full wave rectifying bridge circuit having first and second legs including first and second diodes, respectively, having cathode circuits mutually electrically connected to a first terminal of said battery and third and fourth legs including first and second controlled rectifiers, respectively, having anode circuits mutually electrically connected to a second terminal of said battery, said winding having a first end electrically connected to a first connection joining said first and third bridge legs and a second end electrically connected to a second connection joining said second and fourth bridge legs, a first firing control circuit connected to said first connection and to a gate circuit of said second controlled rectifier to gate said second rectifier into conduction in response to a predetermined energy phase supplied by said winding, a second firing control circuit connected to said second connection and to a gate circuit of said first controlled rectifier to gate said first rectifier into conduction in response to a predetermined energy phase supplied by said winding;

a first switch connecting said first connection to a system ground and a second switch connecting said second connection to said system ground, a charge sensor electrically connected to said battery and operating from a first condition to a second condition to provide a charge signal in response to said battery charge being above a predetermined magnitude, a phase sensor electrically connected to said winding to provide a phase signal in response to the energy generated by said winding, a control circuit electrically connected to said charge and phase sensors to operate said first switch from a first condition to a second condition to interrupt the energy flow to the battery in response to said charge and phase signals, and a second sensor electrically connected to said rectifying circuit to sense the energy thereat and to operate said first and second switches from a first condition to a second condition in response to the sensed energy exceeding a second predetermined magnitude greater than said first magnitude to de-activate said rectifying circuit.

2. An energy regulating system wherein a battery is electrically connected to an electrical energy generating winding of a generator through a connecting circuit with a switch connected to shunt the connecting circuit to a system neutral for operation between a first condition to supply electrical energy from the winding to the battery and a second condition to operatively interrupt the flow of electrical energy from the winding to the battery, wherein the improvement comprises a charge sensor electrically connected to said battery and operating from a first condition to a second condition to provide a charge signal in response to said battery charge being above a predetermined magnitude, a phase sensor electrically connected to said winding to provide a phase signal in response to the energy generated by said winding, and a control circuit including a differential circuit electrically connected to said charge and phase sensors and operatively connected to selectively operate said switch from the first condition to the second condition in response to said phase signal being greater than said charge signal to electrically shunt said connecting circuit to selectively reduce the energy flow to the battery in response to said charge signal and said phase signal.

* * * * *

UNITED STATES PATENT AND TRADEMARK OFFICE
CERTIFICATE OF CORRECTION

PATENT NO. : 4,405,892
DATED : 09-20-83
INVENTOR(S) : RICHARD ELMER STAERZL

It is certified that error appears in the above-identified patent and that said Letters Patent are hereby corrected as shown below:

| | |
|---|---|
| In The Abstract, Line 5 | delete "connection" and substitute therefor ---conduction--- |
| Column 4, Line 29 | after "battery" delete "5" and substitute therefor ---25--- |
| Claim 1, Line 26 | after "winding" delete ";" and substitute therefor ---,--- |

Signed and Sealed this

Seventeenth Day of January 1984

[SEAL]

Attest:

Attesting Officer

GERALD J. MOSSINGHOFF
Commissioner of Patents and Trademarks